Jan. 24, 1933.    A. R. VAN C. WARRINGTON    1,895,357

PROTECTIVE APPARATUS

Filed April 28, 1930

Inventor:
Albert R. van C. Warrington,
by Charles E. Mullen
His Attorney.

Patented Jan. 24, 1933

1,895,357

UNITED STATES PATENT OFFICE

ALBERT R. VAN C. WARRINGTON, OF DREXEL HILL, PENNSYLVANIA, ASSIGNOR TO GENERAL ELECTRIC COMPANY, A CORPORATION OF NEW YORK

PROTECTIVE APPARATUS

Application filed April 28, 1930. Serial No. 447,934.

My invention relates to improvements in protective apparatus for electric circuits and more particularly to improvements in the control of electric power lines under abnormal conditions whereby to obtain more definite, sensitive and reliable operation of fault-responsive protective devices such as relays and the like.

Severe faults, such as heavy short-circuits, occurring on a power line, especially if relatively close to a station where protective relays are located, may reduce an electric quantity of the line, for example the voltage, to less than one percent of normal. Under such conditions, relays whose operation is dependent either wholly or partly on the line voltage may take too long to operate or even fail to operate. Relays thus affected are, for example, power directional relays, so-called distance relays, and others. Any attempt to amplify the voltage on the relay windings under abnormal conditions, if it also amplifies the voltage correspondingly under normal conditions, defeats its own purpose because the relay windings would burn up at normal line voltage or the design would be impractical. An object of my invention is to provide an improved arrangement for so amplifying the energization of the relay under abnormal line conditions without amplification under normal line conditions as to insure the desired and intended operation of such relays as might be otherwise affected by the lack of the necessary energization. Other objects of my invention will appear hereinafter.

My invention will be better understood from the following description when considered in connection with the accompanying drawing and its scope will be pointed out in the appended claims.

Figure 1:
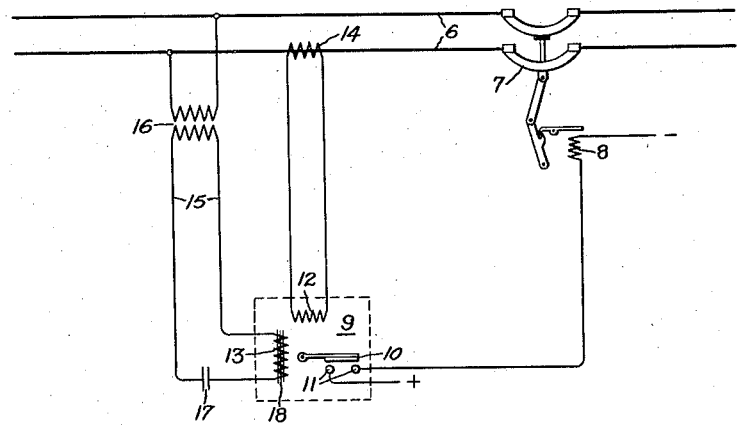
Figure 2:
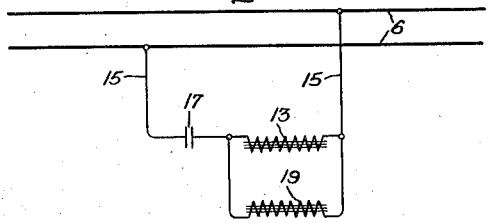
Figure 3:
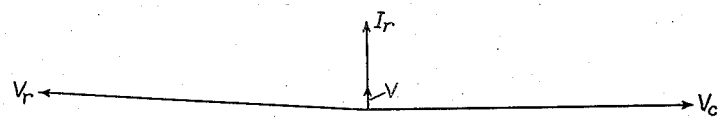
Figure 4:
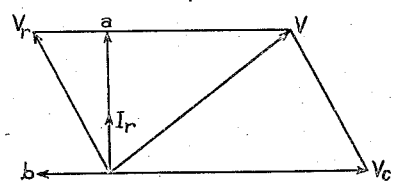
Figure 5:
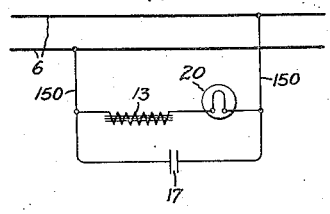

In the accompanying drawing, Fig. 1 illustrates diagrammatically protective apparatus embodying my invention; Fig. 2 illustrates a modification of my invention; Figs. 3 and 4 are vector diagrams explanatory of my invention; and Fig. 5 illustrates another modification of my invention.

In accordance with my invention, I provide the desired amplification of the relay energization by an energizing circuit which is substantially resonant at line frequency for abnormal conditions of the line to be protected, for example voltage on one side of a predetermined value but has its resonance impaired under other line conditions including normal, for example voltage on the other side of the predetermined value. The predetermined value chosen is that percentage of the normal line voltage which will insure the desired operation and which, of course, varies with the construction and character of the line to be protected as well as the relay chosen for protection.

In Fig. 1 there is shown an embodiment of my invention for the protection of a single-phase alternating current or power line 6 which is arranged to be controlled by a latched-closed type of circuit breaker 7 having a trip coil 8.

For controlling the circuit breaker 7 in response to abnormal line conditions, I have shown a protective relay 9 whose operation is dependent on the voltage of the line. As shown, this relay is arranged to control the circuit of the trip coil 8 through its contacts 10, 11 and has two cooperating windings 12, 13. The relay 9 may be a power directional relay, a so-called distance relay or an element of a distance relay. As shown, its current winding 12 is connected to be energized in accordance with the current of the line 6 through suitable means such as a current transformer 14. The voltage winding 13 forms part of an inductive or electromagnetic operating element of the relay 9 and is connected in an energizing circuit 15 which is connected to be energized in accordance with the voltage of the line 6 through suitable means such as a potential transformer 16. While the relay 9 is illustrated as of an electromagnetic type, it will be apparent to those skilled in the art that electrothermal or electrostatic relays can also be used in the practice of my invention.

In accordance with my invention, the energizing circuit 15 is resonant at line frequency when the voltage of the line 6 is below a predetermined value but has its resonance impaired when the voltage is above this value, that is the electrical characteristics of the circuit are such that the resonance of the circuit is inherently variable with the voltage applied to the circuit. For this purpose the energizing circuit 15 includes a capacitance element, such as a condenser 17, which is tuned for resonance at line frequency with the inductance of the voltage element of the relay. This insures a good working voltage for the relay 9 even when the line voltage is very greatly reduced. In order, however, that there may not be sufficient voltage on the winding 13 to destroy it when the line voltage is above the predetermined value or at normal, I provide means for impairing the resonance of the energizing circuit 15 when the predetermined value of the voltage is exceeded.

One way in which this resonance may be impaired is to employ in the construction of the inductive or electromagnetic element of the relay any suitable magnetic structure 18 which substantially saturates at or close to the desired voltage. This so affects the inductance of the voltage operating element as to impair the resonant condition and thereby prevents dangerous voltages on the winding 13. In order to obtain the desired degree of amplification without an excessive current at normal voltage, the magnetic structure of the voltage element is preferably made so as to saturate as completely and abruptly as possible at a relatively low voltage. The magnet of the voltage element may be of any suitable magnetic material or alloy which has high permeability. In this case a comparatively small section of material can be used to give a high degree of saturation.

Fig. 3 represents vectorially the conditions when the energizing circuit 15 is resonant. In this figure $V_c$ and $V_r$ represent the voltages across the condenser 17 and the relay winding 13 respectively. These voltages are approximately 180° apart and their resultant V is the voltage across the energizing circuit 15, this voltage being proportional to the voltage of the line 6. The vector $I_r$ represents the current in the relay winding 13. When the voltage V across the energizing circuit exceeds a predetermined value the voltage element of the relay saturates and the conditions are as shown in Fig. 4. In this figure $a$, $b$ represent respectively the resistance and inductance voltage drops in the relay winding 13. It is to be observed from Figs. 3 and 4 that there is a change in the power factor of the relay voltage winding. While this change can be made relatively small by suitably proportioning the quantities involved, it may be necessary in relays, where this is critical, to make due allowance in order to obtain the desired torque at a given power factor of the line 6.

Instead of having the saturation effect in the electromagnetic voltage element of the relay, there may be placed in circuit with the voltage winding 13 a suitable reactance means which is arranged to saturate at the desired value of the voltage and thereby impair the resonance of the energizing circuit 15. As shown in Fig. 2, this reactance means 19 is connected in parallel with the voltage winding 13.

In the modification of my invention shown in Fig. 5, I employ a parallel resonant circuit 150 which includes the relay winding 13 and the condenser 17. In series with the relay winding 13, I connect a suitable current limiting means, such as a positive temperature coefficient resistance, examples of which are well known to the art and which is illustrated as a tungsten filament lamp 20. In this modification the magnetic element of the relay winding 13 does not saturate. When the voltage of the line 6 is on one side of a predetermined value and under normal voltage conditions, the resistance of the lamp 20 is relatively high and the resonance of the circuit 150 is impaired. As the voltage across the circuit 150 decreases, the resistance of the lamp 20 also decreases until the circuit 150 becomes resonant. Under these conditions a relatively large current appears in the relay winding 13 so that a reliable operation of the relay is insured. In order to have a quick change from the non-resonant to the resonant condition or vice versa, that is no time lag, it is preferable to employ a lamp which cools and heats rapidly.

In this application I am claiming broadly, as well as specifically, my novel means for impairing the resonance of an energizing circuit of an electroresponsive device to control the operation thereof. In the copending application of Oliver C. Traver, Serial No. 447,810, filed April 28, 1930, for protective apparatus, there is described and claimed broadly, as well as specifically, a novel means for impairing the resonance by non-inductive current limiting means.

The specific arrangement of non-inductive current limiting means for impairing resonance, embodying in series with the electroresponsive device, a resistance which increases with the voltage impressed on it, shown in Fig. 5, and claimed both broadly and specifically in this application, is also within the scope of certain claims presented in the Traver application, which claims do not read upon modifications, other than that of Fig. 5, shown in this application While I have shown and described my invention in considerable detail, I do not desire to be limited to the exact arrangements shown, but seek to cover in the appended claims all those modifications that fall within the true spirit and scope of my invention.

What I claim as new and desire to secure by Letters Patent of the United States, is:

1. In combination with an electroresponsive device having an operating winding, a substantially resonant energizing circuit for said winding, and means for normally impairing the resonance of said circuit operative to restore the resonant condition when the voltage of the circuit is below a predetermined value.

2. In combination with a relay having an operating winding, an energizing circuit for said winding including a condenser in series with the winding, said circuit being substantially resonant when the voltage of the circuit is less than a predetermined value, and the electrical characteristics of said circuit being such that the resonance of the circuit is inherently varied when the voltage thereof is above said value.

3. In combination with a device having an electromagnetic operating element including a winding, an energizing circuit for said winding including a condenser in series with the winding, said circuit being substantially resonant when the voltage thereof is less than a predetermined value and said electromagnetic element being saturable to impair the resonance of said circuit when the voltage thereof is above the predetermined value.

4. In combination with an electric power line, means responsive to abnormal conditions of the line including a relay having an operating winding, a substantially resonant circuit in which said winding is connected to be energized from said line, and means for normally impairing the resonance of said circuit operative to restore the resonant condition when a voltage of the line is below a predetermined value.

5. In combination with an electric power line, means responsive to abnormal conditions of the line including a relay having an electromagnetic operating element including a winding, a series-resonant circuit connected to be energized in accordance with a voltage of said line and including a condenser and said winding, the electrical characteristics of said circuit being such that the resonance of the circuit is inherently variable with the voltage applied to the circuit.

6. In combination with an electric power line, means responsive to abnormal conditions of the line including a relay having an electromagnetic operating element including a winding, a series-resonant circuit connected to be energized in accordance wtih a voltage of said line and including a condenser and said winding, and means for impairing the resonance of said circuit saturable when said voltage is above a predetermined value.

7. In combination with an electric power line, means responsive to abnormal conditions of the line including a relay having an electromagnetic operating element including a winding, a series-resonant circuit connected to be energized in accordance with a voltage of said line and including a condenser and said winding, said electromagnetic operating element being saturable to impair the resonance of said circuit when said voltage is above a predetermined value.

8. In combination with an electric power line, means responsive to abnormal conditions of the line including an electroresponsive device having an inductance element, a series-resonant circuit connected to be energized from said line and including said inductance element and a capacitance element, and means for normally impairing the resonance of said circuit.

9. In combination with an electric power line, means responsive to abnormal conditions of the line including an electroresponsive device having an operating winding, an energizing circuit for said winding, the electrical characteristics of said circuit being such that the circuit is inherently substantially resonant when a voltage of said line is on one side of a predetermined value and non-resonant when said voltage is on the other side of said value.

10. In combination with an electroresponsive device, a parallel resonant energizing circuit including said device and non-inductive current limiting means for impairing the resonance of said circuit when the voltage of the circuit differs from a predetermined value.

11. In combination with an electroresponsive device having an inductance element, a substantially resonant energizing circuit including a capacitance element and said inductance element connected in parallel and resistance means connected in series with said inductance element only for impairing the resonance of the circuit when the voltage thereof differs from a predetermined value the characteristic of said resistance means being such that its resistance increases with an increase in voltage impressed upon it.

12. In combination, an electric power line, means responsive to abnormal conditions of the line including a device having an inductance element, a resonant circuit including said inductance element and a capacitance element connected to be energized from said line and means for normally impairing the resonance of said circuit operative to restore the resonant condition upon the occurrence of an abnormal line condition.

13. In combination with an electroresponsive device having an energizing winding, a substantially resonant energizing circuit including said winding, and means for impairing the resonance of said circuit when the voltage thereof is above a predetermined value operative to restore the resonant condition when the voltage of the circuit is below a predetermined value.

14. In combination with an electric power line, means responsive to abnormal conditions of the line including a relay having an energizing winding, a substantially resonant circuit including said winding and connected to be energized by a voltage derived from the line and means for impairing the resonance of said circuit when said voltage is above a predetermined value operative to restore the resonant condition when said voltage is below a predetermined value.

In witness whereof, I have hereunto set my hand this 22nd day of April, 1930.

ALBERT R. van C. WARRINGTON.